(12) United States Patent
Théroux

(10) Patent No.: US 10,179,486 B2
(45) Date of Patent: Jan. 15, 2019

(54) TRACTION AID

(71) Applicant: Daniel Théroux, Sorel-Tracy (CA)

(72) Inventor: Daniel Théroux, Sorel-Tracy (CA)

(73) Assignee: Daniel Theroux, Sorel-Tracy, QC (CA)

( * ) Notice: Subject to any disclaimer, the term of this patent is extended or adjusted under 35 U.S.C. 154(b) by 0 days.

(21) Appl. No.: 15/368,506

(22) Filed: Dec. 2, 2016

(65) Prior Publication Data
US 2017/0158003 A1 Jun. 8, 2017

Related U.S. Application Data

(60) Provisional application No. 62/386,429, filed on Dec. 2, 2015.

(51) Int. Cl.
*B60C 27/02* (2006.01)
*B60C 27/04* (2006.01)
*B60B 15/18* (2006.01)

(52) U.S. Cl.
CPC .......... *B60C 27/0276* (2013.01); *B60B 15/18* (2013.01); *B60C 27/0292* (2013.01); *B60C 27/04* (2013.01); *B60B 2900/551* (2013.01); *B60B 2900/721* (2013.01)

(58) Field of Classification Search
CPC . B60C 27/02; B60C 27/0276; B60C 27/0292; B60C 27/04; B60C 27/20; B60B 15/18
See application file for complete search history.

(56) References Cited

U.S. PATENT DOCUMENTS

| | | | | |
|---|---|---|---|---|
| 3,245,451 A * | 4/1966 | Gellman | ................. | B60C 27/04 152/225 C |
| 3,291,180 A * | 12/1966 | Gellman | ................. | B60C 27/02 152/225 C |
| 3,861,437 A * | 1/1975 | Belknap | ................. | B60C 27/02 152/225 C |
| 4,886,100 A * | 12/1989 | Parker | ................. | B60C 27/045 152/208 |
| 5,569,340 A * | 10/1996 | Ulrich | ................. | B60C 27/04 152/216 |
| 2002/0088519 A1* | 7/2002 | Wilkinson | ............ | B60C 27/02 152/221 |
| 2004/0154717 A1* | 8/2004 | Gray | ................. | B60C 11/16 152/213 R |
| 2009/0314405 A1* | 12/2009 | Heroux | ................. | B60C 27/04 152/225 C |
| 2017/0259632 A1* | 9/2017 | Abad | ................. | B60C 27/04 |

* cited by examiner

*Primary Examiner* — Kip T Kotter
(74) *Attorney, Agent, or Firm* — Anglehart et al.

(57) ABSTRACT

A traction aid for a motor vehicle, comprising an elongated main body having a top and a bottom surfaces, the elongated main body having thereon a series of teeth and a sliding mechanism, a first securing member located at an end of the main body and projecting downwardly and a second securing member located at the bottom surface of the main body and attached to the sliding mechanism. The sliding mechanism allows movement of the second securing member towards or away from the first securing member along the bottom surface of the main body. The traction aid further comprises a securing mechanism configured to move the sliding mechanism and the second securing member towards the first securing member in order to squeeze a tire of the motor vehicle between the first and second securing members.

9 Claims, 3 Drawing Sheets

TRACTION AID

CROSS-REFERENCE TO RELATED APPLICATIONS

This application claims the benefits of U.S. provisional patent application No. 62/386,429 filed on Dec. 2, 2015, which is herein incorporated by reference.

TECHNICAL FIELD

The present disclosure relates to a traction aid for motor vehicles.

BACKGROUND

Motor vehicles can easily be stuck on a terrain that is unfit for vehicular travel, such as muddy, snow or ice covered terrain, or any other such difficult terrain. Traditional traction aids are limited in the aid they can provide. The user must position the traction aid under the tire, which is not always possible and practical. Furthermore, in use the traditional traction aid often turns into a projectile by the spinning wheel, which can be a hazard for anyone standing close by and may even damage the motor vehicle or get loss, for example in a snowbank.

Accordingly, there is a need for traction aid that alleviates these disadvantages.

SUMMARY

There is provided a traction aid for a motor vehicle, comprising:

an elongated main body having a top and a bottom surfaces, the elongated main body having thereon a series of teeth and a sliding mechanism;

a first securing member located at an end of the main body and projecting downwardly;

a second securing member located at the bottom surface of the main body and attached to the sliding mechanism, the sliding mechanism allowing movement of the second securing member towards or away from the first securing member along the bottom surface of the main body; and a securing mechanism configured to move the sliding mechanism and the second securing member towards the first securing member in order to squeeze a tire of the motor vehicle between the first and second securing members.

There is also provided a traction aid as described above, wherein the main body is U-shaped, the main body teeth being located on extremities of the U-shape.

There is further provided a traction aid as described above, wherein a portion of the bottom surface of the main body located between the first and second securing members is provided with one or more anti-skid members configured to engage tread of the tire.

There is still further provided a traction aid as described above, wherein the elongated main body is of a length substantially longer than a width of the tire of the motor vehicle.

There is also provided a traction aid as described above, wherein the securing mechanism is a winch having a strap to be passed through the rim of the wheel.

BRIEF DESCRIPTION OF THE FIGURES

Embodiments of the disclosure will be described by way of examples only with reference to the accompanying drawing, in which.

Similar references used in different Figures denote similar components.

DETAILED DESCRIPTION

Generally stated, the non-limitative illustrative embodiments of the present disclosure provide a traction aid enabling a motor vehicle to move over terrain that is unfit for vehicular travel, such as muddy, snow or ice covered terrain, or any other such difficult terrain. The traction aid is composed of an elongated body configured to be secured to the wheel of the motor vehicle, the elongated body having on a top surface one or more series of ground gripping protuberances or teeth that provide added traction to the wheel and thus allow the bogged down motor vehicle to free itself. The length of the elongated body is such as to allow the traction aid to be fitted to the wheel of any motor vehicle and to engage more around then the width of the wheel, thus improving its grip.

Figure 1:
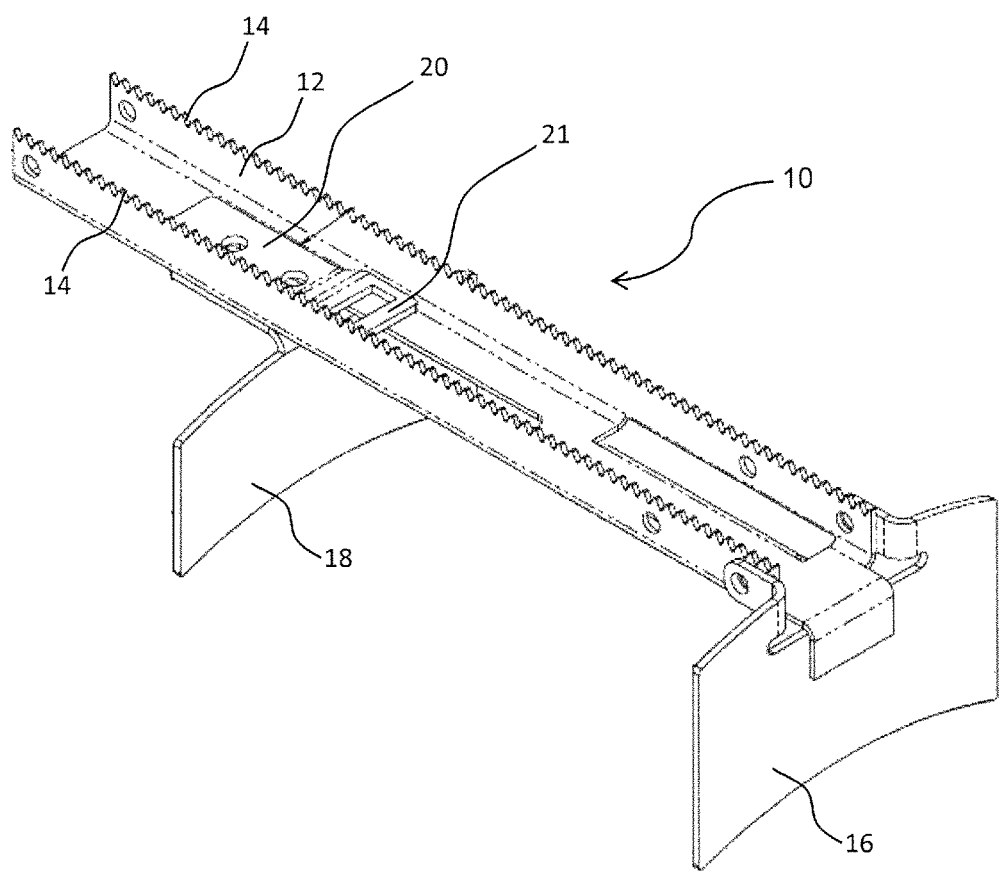
FIG. 1 is an perspective view of a traction aid in accordance with an illustrative embodiment of the present disclosure.
Figure 2:
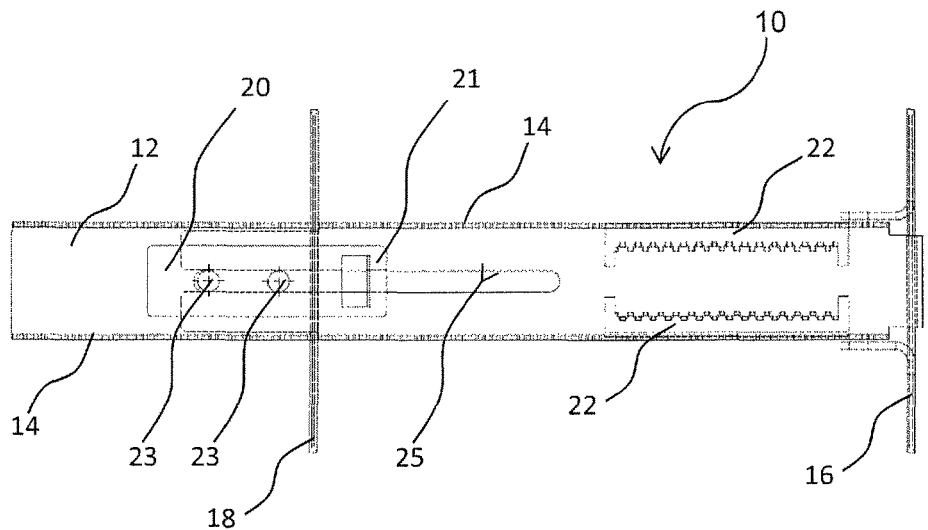
FIG. 2 is a bottom view of the traction aid of FIG. 1.
Figure 3:
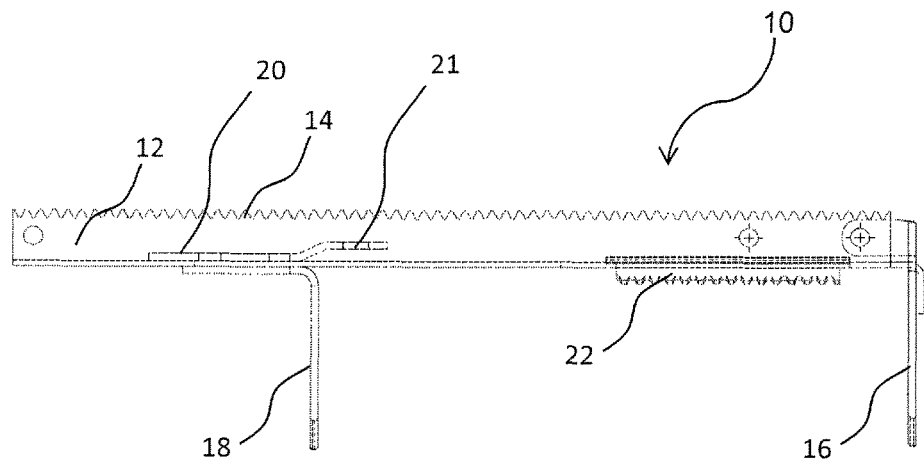
FIG. 3 is a side view of the traction aid of FIG. 1.

Referring to FIGS. 1 to 3, the traction aid 10 in accordance with an illustrative embodiment of the present disclosure is composed of an elongated, generally U-shaped, main body 12 having a series of protuberances or teeth 14 along its upper extremities. At an end, the main body 12 is provided with a first securing member 16, for example a plate, projecting downwardly while a second securing member 18, for example another plate, is movably attached under a bottom surface of the main body 12 via a sliding mechanism 20. The sliding mechanism 20 allows movement of the second securing member 18 towards or away from the first securing member 16. With reference FIGS. 2 and 3, a bottom surface portion of the main body 12 located between the first 16 and second 18 securing members is provided with one or more anti-skid members 22 (protuberances, teeth, corrugations, etc.). The various parts of the traction aid 10 may be made, for example, of metal, aluminum, plastic or any such material.

In an alternative embodiment, the first 16 and second 18 securing members may be removable and the traction aid 10 provided with a plurality of different size securing members in order to adapt to various tire 4 sizes.

Figure 4:
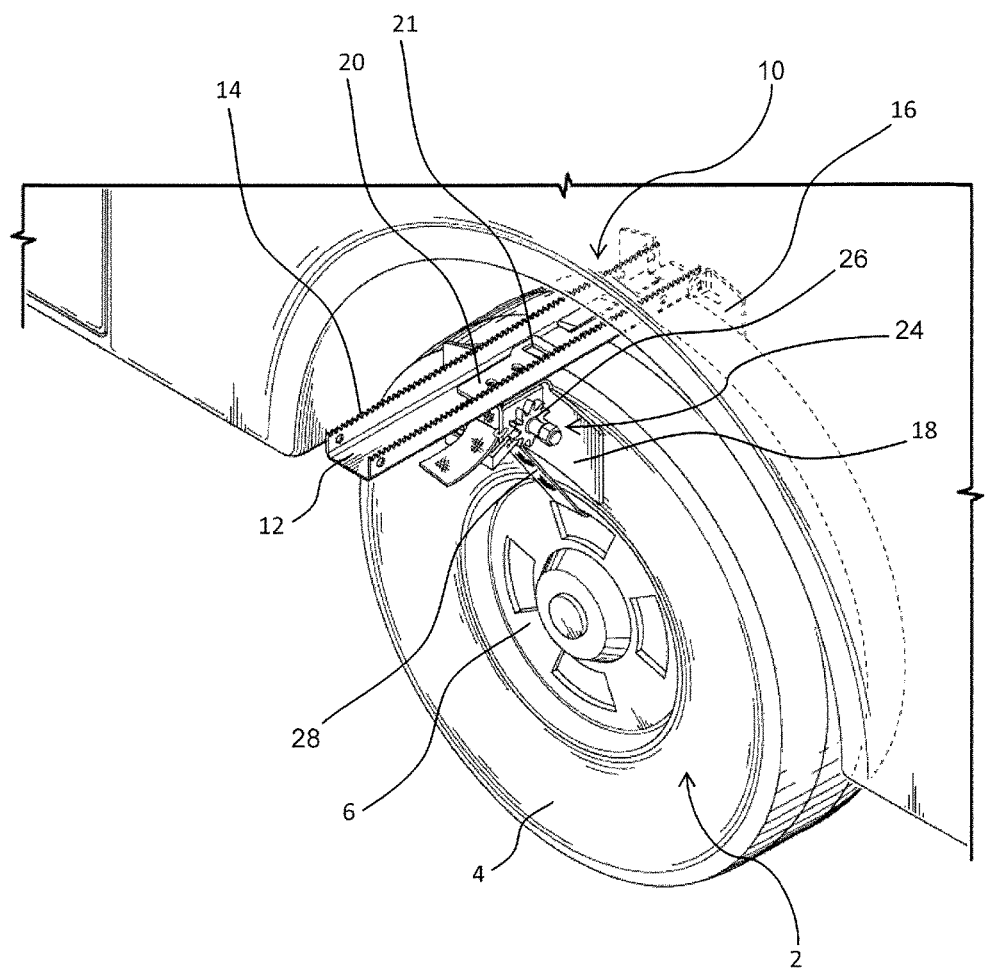
FIG. 4 is a perspective view of the traction aid positioned on a wheel of a vehicle.

Referring now to FIG. 4, the traction aid 10 is further composed of a securing mechanism 24, which in the illustrative embodiment takes the form of a winch 26 attached to the sliding mechanism 20 from the bottom surface of the main body 12 and having a strap 28 configured to be secured to a securing element 21 of the sliding mechanism 20 from a top surface (or alternatively inside) of the main body 12.

In use, the main body 12 of the traction aid 10 is positioned on top of the tire 4 of the motor vehicle wheel 2, parallel to its rotation axis, such that the first securing member 16 is positioned on the side of the wheel 2 inside the wheel well and the second securing member 18 is positioned on the opposite side of the wheel 2. Thus positioned, the one or more anti-skid members 22 at the bottom surface portion of the main body 12 between the first 16 and second 18 securing members are put in contact with the tread of the tire 4 of the wheel 2, providing a gripping effect between the wheel 2 and the traction aid 10. The traction aid 10 is then secured to the wheel 2 by passing the strap 28 through the rim 6 of the wheel 2, then along the top surface of the main body 12, from its end provided with the first securing member 16, and finally securing it to the securing element 21 of the sliding mechanism 20. In an alternative embodiment the strap 28 may be secured to the first securing member 16 or the end of the main body 12 provided with the first securing member 16. In a further alternative embodiment, the strap 28 may be initially secured to the securing element 21, the first securing member 16 or the end of the main body 12 provided with the first securing member 16, and then passed through the rim 6 of the wheel 2 and finally secured to the winch 26 (or other securing mechanism 24).

The winch 26 is then activated so as to tighten the strap 28, which moves the sliding mechanism 20, and thus the second securing member 18, towards the first securing member 16, resulting in a vise effect effectively squeezing the tire 4 between the first 16 and second 18 securing members and thereby tightly securing the traction aid 10 to the wheel 2.

Referring back to FIG. 2, the second securing member 18 and the securing mechanism 24, both located on the bottom surface of the main body 12, may be attached to the sliding mechanism 20, located on the top surface (or alternatively inside) of the main body 12 using screws 23 passing through a slit 25 within the main body 12.

The length of the main body 12 combined with the sliding mechanism 20 allows the traction aid 10 to accommodate various tire 4 widths. Advantageously, the length of the main body 12 is substantially longer than the width of the tire 4 in order to provide an improved ground gripping capability. It is to be understood, however, that in an alternative embodiment the length of the main body 12 may be closer to the width of the tire 4 in order to be more portable.

It is to be further understood that, although the main body 12 is described in the illustrative embodiment as being generally U-shaped, other shapes may be used.

Although the present disclosure has been described with a certain degree of particularity and by way of illustrative embodiments and examples thereof, it is to be understood that the present disclosure is not limited to the features of the embodiments described and illustrated herein, but includes all variations and modifications within the scope of the disclosure as hereinafter claimed.

What is claimed is:

1. A traction aid for a motor vehicle, comprising:
   an elongated main body having a top surface and a bottom surface, the elongated main body having thereon a series of teeth and a sliding mechanism;
   a first securing member located at an end of the main body and projecting downwardly;
   a second securing member located at the bottom surface of the main body and attached to the sliding mechanism, the sliding mechanism allowing movement of the second securing member towards or away from the first securing member along the bottom surface of the main body; and
   a securing mechanism configured to move the sliding mechanism and the second securing member towards the first securing member in order to squeeze a tire of the motor vehicle between the first and second securing members.

2. A traction aid in accordance with claim 1, wherein the main body is U-shaped, the main body teeth being located on extremities of the U-shape.

3. A traction aid in accordance with claim 1, wherein a portion of the bottom surface of the main body located between the first and second securing members is provided with one or more anti-skid members configured to engage tread of the tire.

4. A traction aid in accordance with claim 1, wherein the elongated main body is of a length substantially longer than a width of the tire of the motor vehicle.

5. A traction aid in accordance with claim 1, wherein the securing mechanism is a winch attached to the sliding mechanism from the bottom surface of the main body and having a strap configured to be secured to a securing element of the sliding mechanism from the top surface of the main body.

6. A traction aid in accordance with claim 1, wherein the securing mechanism is a winch attached to the sliding mechanism from the bottom surface of the main body and having a strap configured to be secured to one of the first securing member and the main body.

7. A traction aid in accordance with claim 1, wherein the securing mechanism is a winch attached to the sliding mechanism from the bottom surface of the main body and having a strap secured to a securing element of the sliding mechanism from the top surface of the main body and configured to be operatively secured to the winch.

8. A traction aid in accordance with claim 1, wherein the securing mechanism is a winch attached to the sliding mechanism from the bottom surface of the main body and having a strap configured to be secured to one of the first securing member and the main body and configured to be operatively secured to the winch.

9. A traction aid in accordance with claim 1, wherein the first and second securing members are plates.

* * * * *